United States Patent [19]
Butler, Jr.

[11] Patent Number: 5,890,678
[45] Date of Patent: Apr. 6, 1999

[54] DEVICE TO CONTROL INFLATION CHARACTERISTICS OF PARACHUTES

[75] Inventor: Manley C. Butler, Jr., Roanoke, Va.

[73] Assignee: Butler Aerospace Technologies, Inc., Roanoke, Va.

[21] Appl. No.: 859,212

[22] Filed: May 20, 1997

[51] Int. Cl.$^6$ ................................................. B64D 17/36
[52] U.S. Cl. ............................................................ 244/152
[58] Field of Search .................................. 244/142, 152, 244/145, 146

[56] References Cited

U.S. PATENT DOCUMENTS

| | | | |
|---|---|---|---|
| 2,566,585 | 9/1951 | Smith | 244/152 |
| 2,754,074 | 7/1956 | Schade | 244/152 |
| 4,065,079 | 12/1977 | Winchurch | 244/452 |
| 4,117,993 | 10/1978 | Palm et al. | 244/145 |
| 4,117,994 | 10/1978 | Webb | 244/152 |
| 4,588,149 | 5/1986 | Gold | 244/145 |
| 4,863,119 | 9/1989 | Case et al. | 244/152 |
| 4,927,099 | 5/1990 | Emerson et al. | 244/152 |
| 4,955,564 | 9/1990 | Reuter | 244/149 |
| 5,205,517 | 4/1993 | Reuter | 244/147 |
| 5,209,436 | 5/1993 | Lee | 244/152 |
| 5,738,307 | 4/1998 | Webb | 244/152 |

FOREIGN PATENT DOCUMENTS

| | | |
|---|---|---|
| 918 005 | 9/1954 | Germany . |
| 1098286 | 1/1968 | United Kingdom . |
| 2184699 | 7/1987 | United Kingdom ................... 244/152 |

Primary Examiner—Galen L. Barefoot
Attorney, Agent, or Firm—Jacobson, Price, Holman & Stern, PLLC

[57] ABSTRACT

A round conventional parachute is shown with a small auxiliary canopy for controlling the inflation characteristics of the main canopy, especially large generally axisymmetrical canopies for heavy payloads. The main canopy has a central vent at the apex, and suspension lines descend from the lower edge or skirt of the canopy to risers or harness. The small auxiliary canopy is slidably attached to the suspension lines between the main canopy and the harness. The auxiliary canopy includes a generally hemispherical central inner section made of a low air permeable material and a generally annular flat outer section made of a high air permeable material, preferably one offering little or no resistance to air flow therethrough. The outer section is provided with spaced fittings around the periphery to slidably receive individual suspension lines therethrough. When packed, the auxiliary canopy is located near the mouth of the main canopy to control the shape of the mouth of the main canopy during opening but slides down the suspension lines as the main canopy fully inflates thereby controlling the opening sequence. By controlling the inflation characteristics of the parachute with the auxiliary canopy, the opening forces and/or the time to full open can be reduced, or increased, for a given speed.

33 Claims, 3 Drawing Sheets

DEVICE TO CONTROL INFLATION CHARACTERISTICS OF PARACHUTES

BACKGROUND OF THE INVENTION

1. Field of the Invention

The present invention relates to parachute systems generally for controlling the opening characteristics of parachutes, especially conventional round parachutes. More particularly, this invention relates to reefing systems or devices for slowing the opening or inflation of round or other generally axisymmetrical parachutes to reduce shock and to control the shape of the lower edge of the canopy during opening, especially in larger parachutes.

2. Description of the Prior Art

Parachutes have long been used to lower personnel and unmanned cargo to the ground from airplanes and other airborne craft. A known problem with the use of parachutes is the sudden shock when the canopy of the parachute opens and fills quickly with air. This is especially serious at high speeds where the canopy fills more rapidly. Also, in more recent years, some parachutes have been made with low permeability or zero permeability fabrics, and the opening shock with such parachutes is more severe than with parachutes made with highly permeable fabrics.

Further, as payloads being delivered by parachute have become larger and heavier, the usage of larger parachutes has become necessary. However, such larger parachutes can display undesirable inflation characteristics which limit the practical size of such parachutes. Moreover, it is difficult to control the shape of the lower edge of the large canopy to maintain a symmetric circular shape of the parachute during initial stages of inflation. Such parachutes tend to form in-folded portions and thus do not operate according to the designed inflation characteristics, thus often resulting in structural failure.

Therefore, in the design and use of parachutes for the aerial delivery of a payload, whether for personnel, cargo, or the like, there are several factors to consider. Among these are: (a) the overall flight envelope, including airspeed and altitude, of the aircraft whether fixed wing, helicopter, missile, etc. used to transport and drop the payload to be delivered by the parachute; (b) the overall parachute recovery envelope required for the payload; (c) the minimum acceptable opening altitude; (d) the maximum allowable opening force which can be sustained by the payload or person; (e) other factors such as the allowable weight and pack volume of the parachute. Further, the parachute must be designed to operate with opening forces that do not damage the parachute itself.

One early reefing system to control opening shock was a generally round device, called a "slider" which had rings or grommets around its periphery. All of the suspension lines of the parachute extended through these rings. The panel may or may not have had a center opening and may or may not have been made of a permeable cloth. See, for example, U.S. Pat. No. 4,863,119.

Another device directed to the problem of opening shock is called a reefing line. In this device, a reefing line or cord passes through small rings attached to the skirt of the canopy, and the length of the line or cord determines the reefed diameter of the parachute during inflation. A line cutter then severs the reefing line after a predetermined time delay, allowing the parachute to continue inflation, until the canopy is completely inflated. This system has the disadvantage of being a fixed time delay.

Another device for controlling opening shock is the use of a small canopy mounted inside the main parachute canopy. A series of lines extend from the small internal canopy to the perimeter or lower edge of the main canopy. At high speed, the pressure on the small canopy tensions these lines and prevents the mouth of the main canopy from expanding. See, for example, U.S. Pat. No. 4,117,994. This technique, however, is very sensitive to tuning and manufacturing tolerances, and involves substantial labor in production.

Several other devices to control inflation characteristics of parachutes are shown in U.S. Pat. No. 5,209,436, U.S. Pat. No. 5,205,517, U.S. Pat. No. 4,955,564, U.S. Pat. No. 4,927,099, U.S. Pat. No. 4,588,149 and U.S. Pat. No. 4,065,079. However, the prior art has not previously provided a parachute inflation control device or reefing system which is simple, efficient, effective and reliable in controlling the inflation of conventional round parachutes, including the control of the shape of the lower edge, especially of large canopies.

SUMMARY OF THE INVENTION

In accordance with the foregoing, the present invention relates to a device to control the inflation characteristics of conventional round parachutes, or other generally axisymmetric parachutes, such as cruciform or cross parachutes, especially large round parachutes which deliver heavy unmanned cargo up to 5,000 pounds or more from an aircraft to the ground. In operation, the device balances the net mass flow of air into the canopy to adjust the opening time in proportion to the velocity to produce acceptable inflation characteristics for a particular application.

The parachute of this invention has a conventional main canopy, such as a round canopy formed of a plurality of gore panels as is well known in the art. The outer edges of the gore panels define the skirt or lower edge of the parachute when fully open. The skirt or lower edge is conventionally referred to as the mouth of the parachute when folded for stowage and during the early stages of opening or inflation. Suspension lines are connected to the lower edge of the gore panels preferably at the radial seams which join the gore panels. The suspension lines extend from their point of attachment on the lower edge or skirt of the parachute to the risers or load bearing harness. The risers or load harness may be of any conventional construction for supporting the parachutist or payload.

Usually for convenience of construction, the inner or upper edges of the gore panels form a generally circular vent or opening in the center or apex of the main canopy. The apex opening is preferably devoid of fabric or there may be an open mesh material spanning the vent and connecting the inner edges of the gore panels. Such a mesh normally should not offer any substantial resistance to air flow.

In accordance with the invention, a smaller auxiliary canopy is co-axially located in the mouth of the main canopy and is surrounded by the upper section of the suspension lines where they attach to the lower edge of the canopy. The auxiliary canopy is made up of a central inner section and a surrounding outer section. The inner section is generally circular in plan view and arcuate in cross-section with the concave surface facing downwardly. Preferably, the central inner section is hemispherical in shape. The inner section is made of a material having a low air permeability. For the convenience of construction and manufacture, the inner section can be made of the same material as the main canopy. However, the air permeability of the inner section fabric may be more or less than the permeability of the main canopy fabric. Further, while the central inner section of the auxiliary canopy is preferably of solid fabric construction, it may include a vent or opening in its center or apex of a type similar to the vent in the main canopy.

The surrounding outer section of the auxiliary canopy in accordance with the present invention is made of a more permeable material than the inner section, preferably of a material having a very high air permeability. Most preferably, the outer section is made of a material which offers little or no resistance to air flow therethrough, such as an open mesh material or open lattice work made from flat tape or the like, which offers no substantial resistance to air flow. The outer section is attached directly to the lower or outer edge of the inner section and forms an annular skirt around the inner section that is generally flat or planar when the auxiliary canopy is inflated. The suspension lines are loosely threaded through any conventional fittings, such as rings, grommets, washers, or the like, spaced about the periphery of the outer section so that the auxiliary canopy can slide along the suspension lines of the main canopy.

As described above, the auxiliary canopy is preferably generally circular in plan view, which is the desired shape when used with conventional round main canopies. In this manner, the auxiliary canopy has generally the same peripheral shape as the lower edge or skirt of the main canopy. For other generally axisymmetrical canopies besides round parachutes, such as cruciform or cross parachutes, the auxiliary canopy of the present invention preferably has a shape which more closely conforms to the shape of the lower edge of the main canopy when inflated. Hence, for cruciform or cross parachutes, the auxiliary canopy of the present invention is preferably octagonally shaped.

A parachute constructed with an auxiliary canopy of the present invention has an inflation control system which is self-regulating. When the parachute is packed, the auxiliary canopy is placed in the mouth of the main canopy with the mouth of the auxiliary canopy approximately even with the mouth of the main canopy. The fittings about the periphery of the auxiliary canopy are positioned at or near the top of the suspension lines adjacent their attachment to the skirt of the main canopy.

During the inflation sequence, after the parachute has reached line stretch, the central inner section of the auxiliary canopy opens in a very short time because of its extremely small internal volume. As the inner section opens it forces the skirt of the main canopy to move radially outwardly in all directions. This outward movement of the skirt causes the main canopy to immediately circularize and establishes a uniform airflow around the inflated generally circular shape of the central inner section, through the mesh panel or open lattice work of the surrounding outer section and then into the mouth of the main canopy. This uniform airflow rapidly begins to fill the main canopy and forces the skirt of the main canopy open to approximately the diameter of the outer mesh panel of the auxiliary canopy. This rapid initial inflation of the main canopy causes the main canopy to exert a significant drag force on the payload, much earlier in the inflation sequence as compared to an identical parachute without the auxiliary canopy.

At the same time, the main canopy growth is constrained by the engagement of the upper portions of the suspension lines in the fittings around the periphery of the auxiliary canopy, thus initially reefing the mouth of the main canopy to the approximate diameter of the auxiliary canopy. This reefing significantly delays the continued rapid growth of the main canopy which would normally occur and could result in excessive force being applied to the main canopy and the payload.

In this manner, a very uniform air flow is established around the central inner section of the auxiliary canopy and through the porous surrounding outer panel into the main canopy, resulting in a smoother inflation. As the main canopy continues to inflate, the spreading of the main canopy skirt causes the suspension lines to move farther apart. The outward radial force component in each suspension lines gradually becomes great enough so that the aerodynamic force holding the auxiliary canopy up is overcome and the auxiliary canopy gradually begins to move down the suspension lines allowing further growth of the main canopy. The auxiliary canopy moves down the suspension lines to reach a level on the suspension lines where their separation more nearly matches the dimension of the auxiliary canopy.

It is therefore an object of the present invention to reduce the peak opening shock forces of a parachute canopy, especially a large canopy, by creating a small initial opening with a small auxiliary canopy and extending the opening shock pulse of the main canopy as it uniformly inflates. The reduction in the opening shock of the main canopy takes place as a result of the delay in the filling of the main canopy.

It is a further object of this invention to reduce the total time required for the main canopy to fully inflate by accelerating the initial opening of the main canopy skirt using the inflation of the auxiliary canopy to force the skirt of the main canopy outward thereby increasing the effective inflow cross sectional area for a given elapsed time.

It is another object of this invention to reduce the total distance traveled for the main canopy to fully inflate by accelerating the initial opening of the main canopy skirt using the inflation of the auxiliary canopy to force the skirt of the main canopy outward thereby increasing the effective instantaneous inflow cross sectional area for a given distance traveled through the air.

It is a still further object of this invention to provide an auxiliary canopy to control the inflation characteristics of a generally axisymmetrical main canopy, especially larger round canopies, in which the auxiliary canopy is made of a central inner section having a low air permeability for rapid initial inflation and a surrounding outer section of very high air permeability to allow air flowing around the central inner section to enter the mouth of the parachute main canopy for rapid initial inflation, thus causing higher drag and reduced velocity of the parachute during early stages of deployment.

It is still another object of this invention to prevent asymmetrical deployment of a round main canopy by using the spreading forces of the auxiliary canopy to force the skirt of the main canopy to open in an optimum circular shape. The routing of the suspension lines through the fittings on the periphery of the auxiliary canopy ensures that the main canopy will open symmetrically under virtually all circumstances. This configuration also assures essentially equal loading of all the suspension lines which, in turn, allows a substantial reduction in margins of safety for all structural elements of the parachute system.

It is yet another object of the present invention to minimize the irregular shaping during inflation of the lower edge of a round parachute canopy, especially a large canopy, by positively expanding and circularizing the inlet area of the main canopy with an auxiliary canopy which forces the skirt of the main canopy to open in an optimum circular shape.

It is still yet another object of this invention to prevent "line over" type malfunctions and damage of the type common to conventional parachutes deployed without deployment control devices. This is achieved by preventing asymmetrical deployments of the main canopy by using the spreading forces of the auxiliary canopy to force the skirt of the main canopy to open in the optimum shape. The routing of the suspension lines through the fittings on the periphery of the auxiliary canopy ensures that the main canopy will open symmetrically under virtually all circumstances. This configuration assures essentially equal loading on all the lines which, in turn allows a substantial reduction in margins of safety for all structural elements of the parachute system.

A still further object of this invention is to provide a parachute inflation control system which can safely be used with a pilot ejector mechanism at various combinations of ejection speeds and altitudes, including relatively low speed at low altitude and relatively high speed at any altitude.

Yet another object of this invention to be specifically enumerated herein is to provide a parachute and an auxiliary canopy in accordance with the preceding objects and which will conform to conventional forms of manufacture, be of simple construction and easy to use so as to provide an inflation control system that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF PREFERRED EMBODIMENTS

In describing the preferred embodiments of the present invention as illustrated in the drawings, specific terminology will be resorted to for the sake of clarity. However, the invention is not intended to be limited to the specific embodiments illustrated and terms so selected; it being understood that each specific term includes all technical equivalents which operate in a similar manner to accomplish a similar purpose.

Also, in the drawings, all of the suspension lines of the main canopy are not shown in the interest of clarity. Normally, there is a suspension line at each radial seam formed by the intersecting sides of the gore panels and a corresponding fitting around the periphery of the auxiliary canopy. The mesh of the preferred annular skirt of the auxiliary canopy is depicted only partially also in the interest of clarity.

Figure 1:
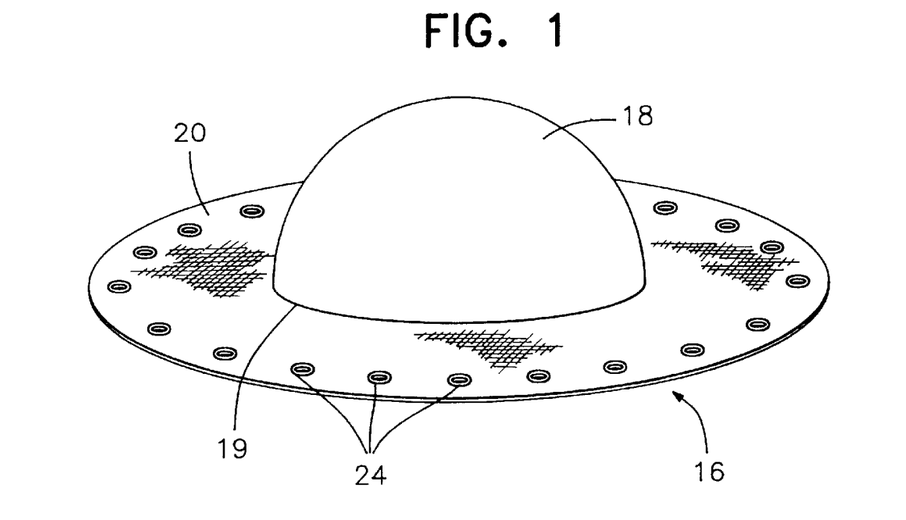
FIG. 1 is a perspective view of a preferred auxiliary canopy constructed in accordance with the present invention after inflation.

A preferred auxiliary canopy in accordance with the present invention is illustrated in its inflated configuration in FIG. 1 and is generally denoted by the numeral 16. The auxiliary canopy 16 includes a central inner section 18 and a surrounding outer section 20. As shown, the central inner section 18 is generally circular and arcuate in cross section, with the concave surface facing downwardly. In its preferred form, the inner section 18 is in the shape of a hemisphere. The inner section 18 is constructed of a fabric material having a low air permeability, preferably equal to or less than the air permeability of the main canopy fabric to which it is to be applied. If desired, the inner section can be made from the same fabric material as the main canopy for ease of construction and manufacture.

Figure 2:
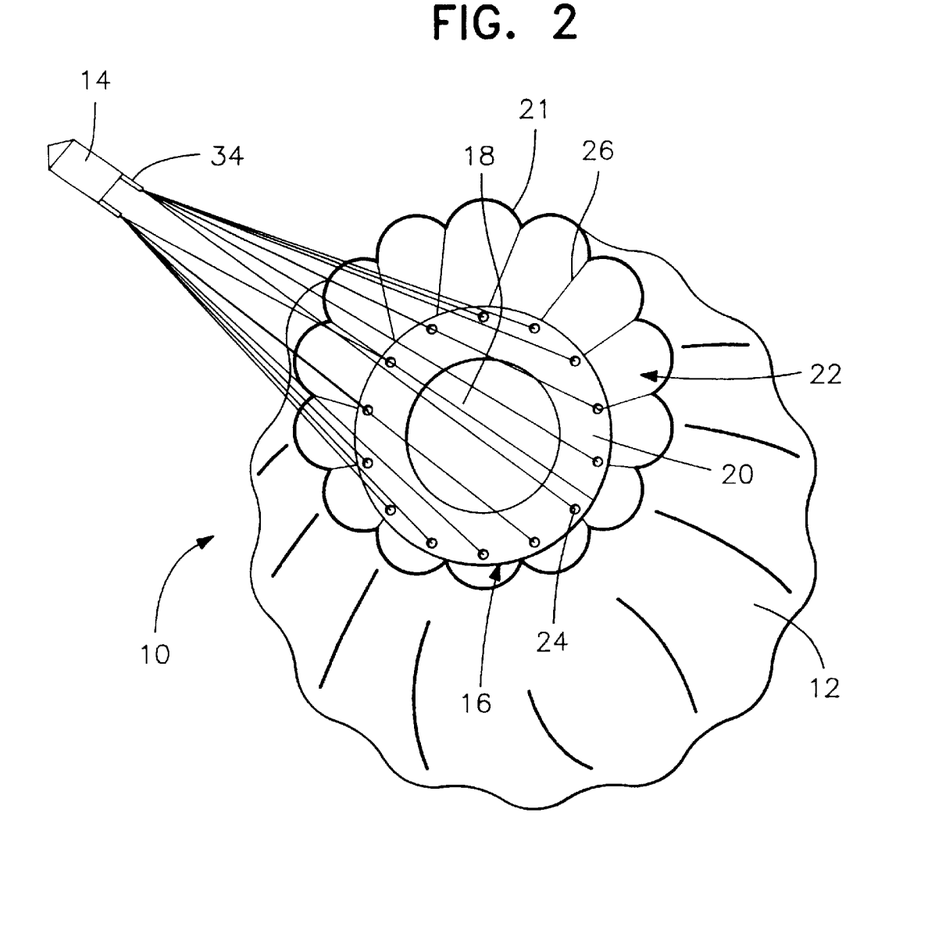
FIG. 2 is a side elevation view of a round parachute equipped with the auxiliary canopy in accordance with the present invention during the initial opening sequence, with a partial showing of the suspension lines.
Figure 3:
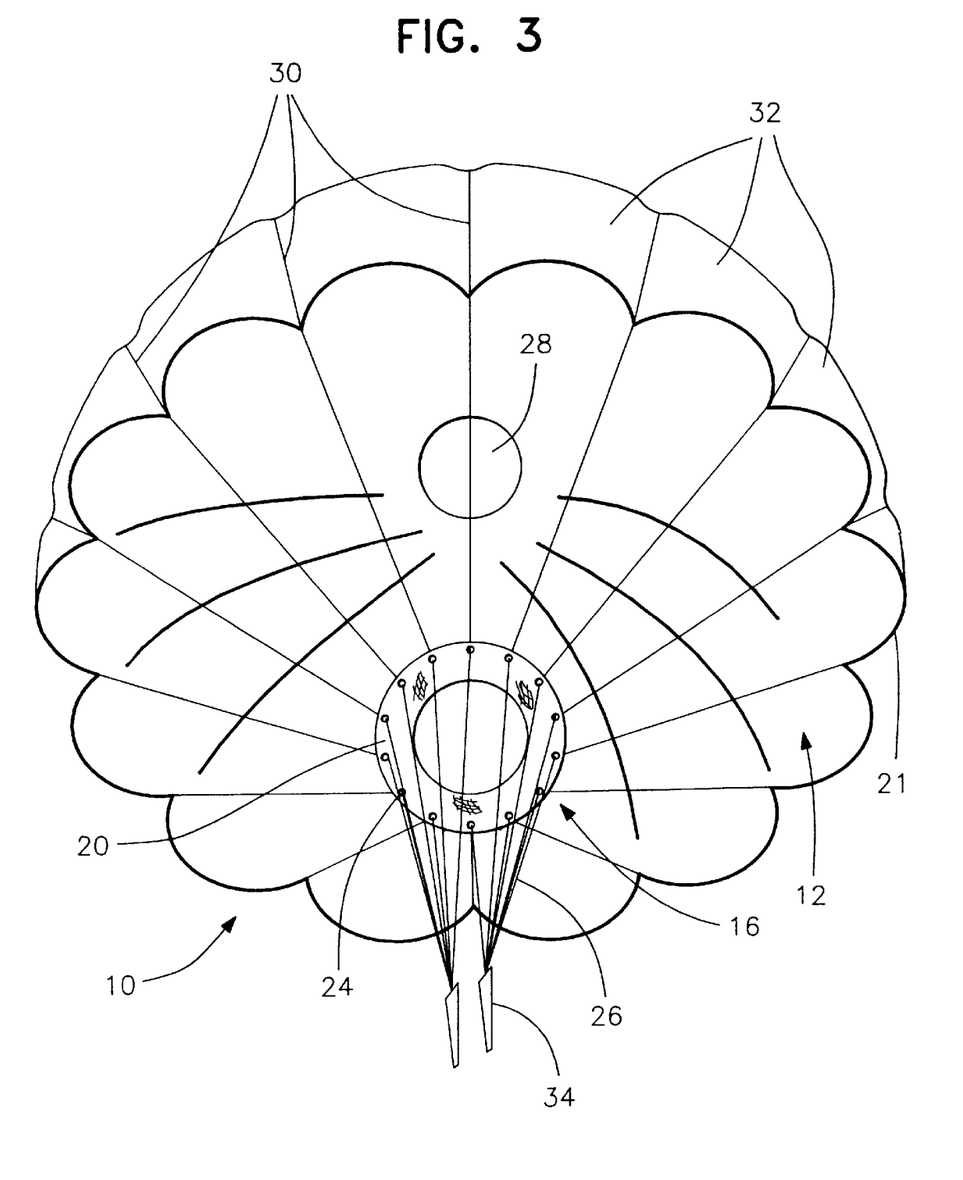
FIG. 3 is a underneath elevation view of the parachute shown in FIG. 1 at a later stage in the opening sequence, partially inflated, with a partial showing of the suspension lines and the preferred mesh outer panel of the auxiliary canopy.

The surrounding outer section 20 is attached around the entire periphery or outer edge 19 of the inner section 18 and is also generally circular in shape, thus forming a generally flat annular outer section when the auxiliary canopy 16 is inflated. The outer section 20 is made of a more permeable material than the inner section 18, and preferably of a material having a high air permeability. Most preferably, the outer section is made of a material which offers little or no resistance to air flow therethrough, such as an open mesh material, as shown in FIGS. 1, 2 and 3, or an open lattice work formed from conventional reinforcing tape or the like. Conventional grommets 24 are preferably equally spaced around the periphery of the outer section 20 to receive the suspension lines of the parachute therethrough. Any conventional fitting can be used in place of grommets 24, such as rings or washers which can be attached to the periphery of the outer section 20 or stitched into the section material, or any other conventional component which can slidably receive a suspension line therethrough. While it is preferred that only a single suspension line be slidably received through each grommet 24, it is possible in accordance with the present invention that more than one suspension line be slidably received in each corresponding grommet or fitting 24.

Referring now to FIG. 2, the overall parachute, generally denoted by the numeral 10, has reached line stretch after deployment from the aircraft and the main canopy 12 has begun to inflate. The parachute 10 is still in the generally horizontal position with the payload 14 upstream in the airflow in relation to the main canopy 12. Auxiliary canopy 16 has fully deployed with the central inner section 18 shown fully inflated. The outer annular section 20 of the auxiliary canopy 16 which surrounds the inner section 18 is also inflated. In this initial stage of inflation, the outside edge of the outer annular section 20 of the auxiliary canopy 16 is located very close to the lower edge or periphery 21 of the main canopy 12, as shown.

Since the inner section 18 of the auxiliary canopy 16 has a generally arcuate shape and, preferably, is formed of a material having a low permeability, the inner section 18 inflates almost immediately upon initial deployment of the parachute 10, generally assuming the condition shown in FIG. 2. The inflation of the inner section 18, in proximity to the lower edge 21 of the main canopy 12, forces the lower edge 21 to move outwardly and form a generally circularized opening for the mouth 22. Thus, when positioned in the mouth 22, the inflation of the central inner section 18 exercises a direct and immediate control over the initial circumference of the mouth 22, causing the diameter of the mouth 22 to conform to the diameter of the inflated inner section 18.

Once inflated, the air flow is forced around the inner section 18, through the outer annular section 20 and into the mouth 22 of the main canopy. The force of the suspension lines 26 on the outside edge of the outer annular section 20 also causes this section to flatten and further circularize the mouth opening 22 in the main canopy 12. While the mouth 22 of the main canopy 12 is circularized by the symmetric airflow about the auxiliary canopy 16, its further expansion is restricted, or reefed, by the grommets 24 around the outer edge of the auxiliary canopy through which the suspension lines 26 are slidably received. As illustrated in FIG. 2 during this initial stage of inflation, the suspension lines 26 have a substantial angular disposition through the grommets 24 in the edge of the annular outer section 20 of the auxiliary canopy. The disposition of the suspension lines 26 between the outer edge of the main canopy 12 and the outer annular section 20 of the auxiliary canopy 16 is approximately at right angles to the disposition of the suspension lines 26 between the section 20 and the load harness 12.

At this point in time, the initial inflation of the main canopy 12 is significantly further along than a similar parachute not equipped with an auxiliary canopy in accordance with the present invention, especially a large main canopy. The drag has thus increased significantly because of the increasing drag area caused by the opening of the main canopy, which in turn results in a reduction of velocity. As the air flow is directed about the inflated inner section 18 into and through the vent 28 shown in FIG. 3, the velocity continues to decrease. The maximum opening diameter of the main canopy thus occurs at a much lower speed than the initial velocity. Therefore, in accordance with the present invention, the auxiliary canopy first accelerates the initial stages of opening of the main canopy and then through the reefing of the top of the suspension lines as they extend through grommets 24 around the outer edge of the auxiliary canopy, introduces a delay in completion of the opening, thereby reducing the opening shock.

In FIG. 3, the parachute 10 is in a later stage of inflation. Each radial seam 30 is formed by the intersection of two gore panels 32 and the outer edges of the gore panels 32 form the lower edge 21 of the canopy 12 and the periphery of the mouth 22. The inner edges of the gore panels 32 form the periphery of the vent or opening 28 at the apex of the canopy 12. While the vent 28 is preferably left open in accordance with the present invention, or covered with a high permeability fabric or mesh which offers little or no restriction to the air flow through the opening 28, there may be circumstances in which the vent or opening 28 is covered with a fabric or device having some restriction to the air flow therethrough. More specifically, the vent or opening 28 may be covered by a cloth of variable permeability with the variation in permeability being dependent on changes in the local dynamic pressure. Alternatively, the vent opening could be covered or controlled by a device which controls the geometric porosity of the vent as a function of the local dynamic pressure. Another possibility is to cover the vent opening with a frangible cloth panel which will fail at a pre-determined dynamic pressure. Once failing, the opening becomes unrestricted thus further slowing the opening of the parachute.

Suspension lines 26 are attached to the lower edge 21 of the canopy 12 at each radial seam 30. The suspension lines 26 descend from the edge 21 of the main canopy in a generally straight line through the grommets 24 of auxiliary canopy 16 to the load harness 34. The almost straight alignment of the suspension lines indicates that the reefing effect of the auxiliary canopy has been overcome by the inflation of the main canopy.

Figure 4:
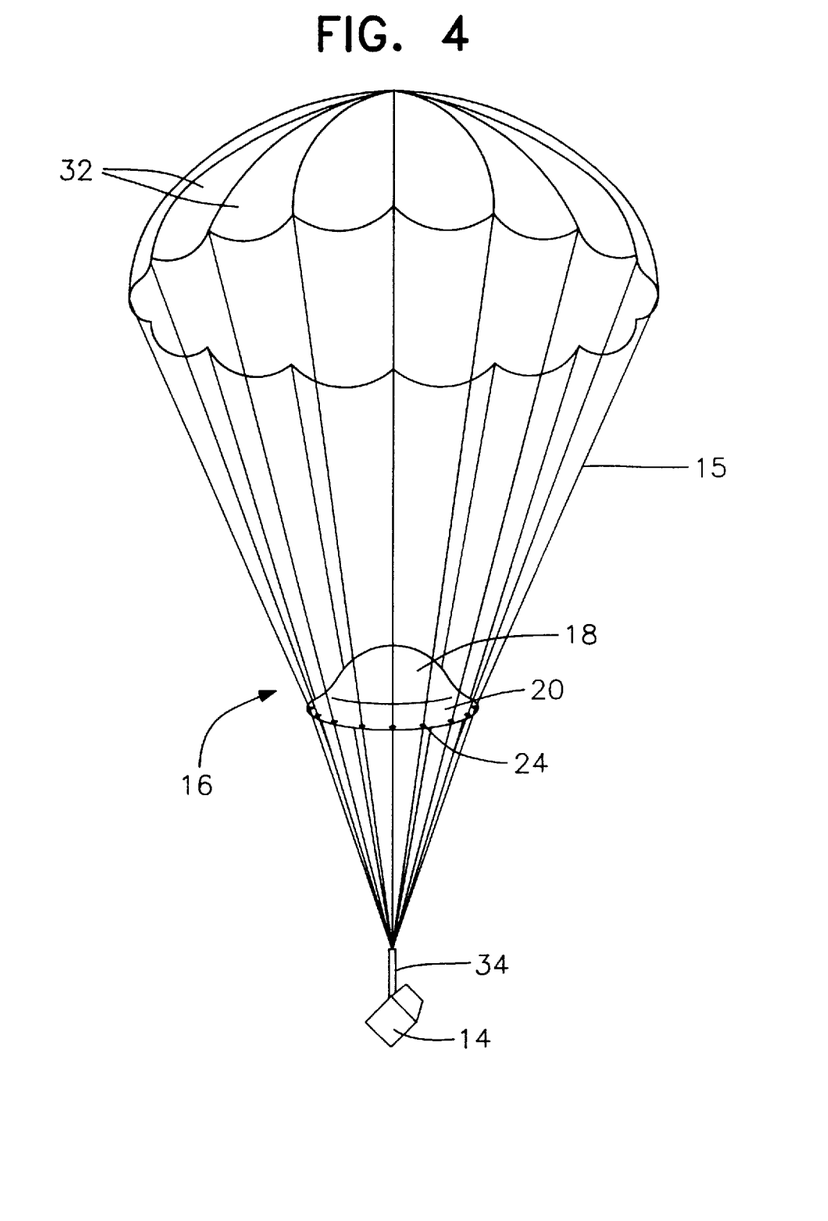
FIG. 4 is a side elevation view of the parachute of FIG. 1 fully inflated, with a partial showing of the suspension lines.

In FIG. 4, the auxiliary canopy 16 has slid down the suspension lines 26 toward its final location. The suspension lines 26 form straight lines from the lower edge 21 of the main canopy 12 through the grommets 24 to the load harness 34. The arcuate inner section 18 of the auxiliary canopy 16 remains inflated. The mesh of the annular outer section 20 has no significant air resistance.

During the design process for a particular application using the present invention, the designer can use a number of parameters to obtain the desired inflation characteristics, such as: (a) main canopy apex vent area as a percentage of main canopy surface area and its effective geometric porosity; (b) cloth permeability of the main canopy and central inner section of the auxiliary canopy; (c) projected or planform area of the entire auxiliary canopy as a percentage of main canopy surface area; (d) projected or planform area of the central inner section of the auxiliary canopy as a percentage of main canopy surface area; and (e) the initial position of the auxiliary canopy in relation to the skirt of the main canopy. In general, using these parameters, the designer can obtain an optimal net mass inflow, which results in the desired drag area growth profile for a particular application.

In accordance with the foregoing, the auxiliary canopy 16 of the present invention can be used on any size round or other generally axisymmetric parachute typical for personnel and target recovery parachutes. Practically speaking, the auxiliary canopy of the present invention can be used on parachutes as small as 15 feet in diameter, and even less, up to extremely large parachutes as much as 150 feet in diameter. The size of the apex vent 28, expressed as a percentage of the surface area of the main canopy, can be as low as zero and as high as 5%, and perhaps more. Preferably, the vent 28 is about 0.25% to about 3% of the surface area of the main canopy 12.

The air permeability for the arcuate or hemispherical central inner section 18 is preferably quite low, on the order of 0–20 cubic feet per minute per square foot (CFM), but can go as high as 200 CFM, or higher, depending upon the desired result to be achieved by the auxiliary canopy. The projected area of the auxiliary canopy 16, expressed as a percentage of the total surface area of the main canopy, can range from a low of about 2% to as high as about 15%. The preferred range is about 3% to about 10%. Most preferably, the auxiliary canopy 16 has a projected or planform area about 4% to about 5% of the total surface area of the main canopy. The projected area of the inner section 18 should comprise between about 30% and about 70% of the total projected area of the auxiliary canopy 16, or between about 1% and about 10% of the total surface area of the main canopy. Preferably, the projected area of the central inner section is about 40% to about 50% of the total projected area of the auxiliary canopy. In designing the optimum auxiliary canopy for a particular parachute system, larger auxiliary canopies with a smaller proportion in the central inner section 18 should be utilized where an extremely fast opening of the main canopy is desired. In contrast, where a slower opening is desired, smaller auxiliary canopies with a larger proportion in the central inner section 18 should be utilized.

Further, the permeability of the central inner section 18 can be increased by including a vent or opening in the apex of the inner section, in a manner similar to the apex vent 28 at the apex of the main canopy 12. The apex vent of the auxiliary canopy can similarly be opened or covered with an appropriate fabric to introduce a design permeability into the central inner section 18. The apex vent could also be made of a cloth of variable permeability, with the variation in permeability being dependent on changes in the local dynamic pressure.

By way of example, only, in a parachute having a main canopy surface area of 500 square feet, the apex vent area is preferably about 2 percent, or 10 square feet. The total projected area of the auxiliary canopy 16 is preferably about 4–5 percent of the total surface area of the main canopy, or about 20–25 square feet. The projected area of the inner section 20 comprises approximately 40 percent of the total projected area of the auxiliary canopy 16. Stated another way, the projected area of the inner section of the auxiliary canopy is about 2 percent of the main canopy surface area and the projected area of the outer panel of the auxiliary canopy is about 3 percent of the main canopy surface area. The length of the suspension lines from the lower edge 21 of the main canopy to the load harness 34 is approximately 20 feet. The air permeability of the parachute material in the main canopy and the inner section of the auxiliary canopy is approximately 3–5 CFM. The opening sequence takes approximately 3 to 4 seconds with a 400 pound load at 200 knots. The same main canopy without an auxiliary canopy of the present invention opens in about 1 second at 175 knots with only a 300 pound load.

The control of the opening or inflation of the main canopy in accordance with the present invention can also be adjusted by positioning of the auxiliary canopy at selected locations along the upper end of the suspension lines. In the preferred embodiment, the skirt or lower edge 19 of the central inner section 18 is adjacent the skirt or lower edge 21 of the main canopy. This side-by-side relationship of the skirts provides the most effective initial spreading force on the skirt or lower edge 21 of the main canopy 12. Further, the characteristics of the parachute and auxiliary canopy of this invention can be modified by changing any one or a combination of the vent area, the material permeability, or the auxiliary canopy areas. Also, the location of the auxiliary canopy, along the suspension lines, in the packed parachute can be adjusted.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A parachute having inflation control characteristics which comprises a main canopy, suspension lines connected to said main canopy and descending therefrom to lower ends for attachment to a load, and an auxiliary canopy having an inflatable inner section made of a less permeable material and an outer section made of a more permeable material, said outer section slidably attached to at least a portion of said suspension lines between said main canopy and said lower ends.

2. A parachute in accordance with claim 1 wherein said parachute is a round parachute, said auxiliary canopy is generally circular, said inner section is generally arcuate when inflated and said outer section is generally annular in shape.

3. A parachute in accordance with claim 1 wherein said main canopy has a vent opening which is less than about 5 percent of said main canopy surface area.

4. A parachute in accordance with claim 1 wherein the surface area of said auxiliary canopy is about 2 percent to about 15 percent of said main canopy surface area.

5. A parachute in accordance with claim 1 wherein said inner section of said auxiliary canopy has a surface area which is about 30 percent to about 70 percent of said auxiliary canopy surface area.

6. A parachute in accordance with claim 1 wherein said inflatable inner section has a permeability of 0 to about 200 cubic feet per minute per square foot and said outer section is made of a material which offers little or no resistance to air flow.

7. A parachute in accordance with claim 1 wherein said main canopy is generally round, said inner portion of said auxiliary canopy is generally hemispherical, and said annular outer portion is generally planar.

8. A parachute in accordance with claim 3 wherein said vent opening is covered by a cloth of variable permeability with said variation in permeability being dependent on changes in local dynamic pressure.

9. A parachute in accordance with claim 3 wherein said vent opening is covered by a device to control the geometric porosity of the vent as a function of local dynamic pressure.

10. A parachute in accordance with claim 3 wherein said vent opening is covered by a frangible cloth panel which will fail at a pre-determined dynamic pressure, thus further slowing the opening of the parachute.

11. A parachute in accordance with claim 10 wherein said parachute is generally axisymmetrical.

12. A parachute in accordance with claim 1 wherein said outer section is slidably attached to all of said suspension lines.

13. A parachute having inflation controlling characteristics which comprises:
    a) a main canopy made of flexible material having a mouth opening defined by a peripheral edge;
    b) suspension lines depending from said peripheral edge to lower ends for connection to a load;
    c) an auxiliary canopy having a substantially smaller diameter than said main canopy slidably connected to said suspension lines between said main canopy and said lower ends;
    d) said auxiliary canopy having a central section made of said flexible material and an outer section surrounding said central section generally an equal distance in all radial directions;
    e) said outer section being of a greater permeability material than said central section; and
    f) said auxiliary canopy initially shaping and temporarily restricting said opening of the main canopy during its opening sequence.

14. A parachute in accordance with claim 13 wherein said slidable connection comprises a plurality of reinforced apertures formed in a periphery of said outer section, each aperture having a suspension fine disposed therethrough.

15. A parachute in accordance with claim 13 wherein said flexible material has an air permeability in the range of 3 to 5 cubic feet pea minute per square foot.

16. A parachute in accordance with claim 13 wherein said main canopy has a central vent formed as an opening in said flexible material.

17. A parachute in accordance with claim 13 wherein said outer portion of said auxiliary canopy is formed of an open mesh material.

18. A parachute in accordance with claim 13 wherein said outer portion of said auxiliary canopy is an open lattice work.

19. In a packed parachute having a large main canopy with attached suspension lines extending from the peripheral edge of said canopy and adapted to engage a load harness, a small auxiliary canopy connected to said suspension lines by a slidable connection at the extremity, said extremity of said auxiliary canopy superimposed on said peripheral edge of said main canopy and said slidable connection located on said suspension lines at said peripheral edge of said main canopy, said auxiliary canopy having a central section made of a material of lower air permeability and an annular outer section of a material of higher air permeability, whereby said smaller auxiliary canopy of said packed parachute deploys first and provides a radial reefing and shaping force on said main canopy and directing air flow about said central section for uniform deployment of said main canopy during its opening sequence.

20. An auxiliary canopy for controlling the inflation characteristics of a main canopy of a parachute which comprises an arcuate downwardly concave facing circular central inner section made of a less air permeable material connected along its outer periphery with a generally flat surrounding outer section made of a more air permeable material, and a series of spaced reinforced openings along the periphery of said outer section for receiving suspension lines connected to said main canopy.

21. An auxiliary canopy in accordance with claim 20 wherein the surface area of said auxiliary canopy is about 2 to about 15 percent of said main canopy surface area.

22. An auxiliary canopy in accordance with claim 20 wherein said central inner section has a surface area which is approximately 30 to approximately 70 percent of said auxiliary canopy surface area.

23. An auxiliary canopy in accordance with claim 20 wherein said central inner section has an air permeability equal to or less than said main canopy air permeability.

24. An auxiliary canopy in accordance with claim 20 wherein said annular outer section presents little or no resistance to air flow therethrough.

25. An auxiliary canopy in accordance with claim 20 wherein the inner section of the auxiliary canopy has an apex vent of a type similar to the main canopy.

26. An auxiliary canopy in accordance with claim 20 wherein the inner section of the auxiliary canopy is made of a cloth of variable permeability with said variation in permeability being dependent on changes in local dynamic pressure.

27. The method of initially shaping and temporarily restricting the opening of a mouth of a generally axisymmetric parachute main canopy having suspension lines attached around a lower edge thereof which comprises forming a generally circularized initial opening for said mouth during the initial stage of inflation of said main canopy by inflating an auxiliary canopy which circumferentially and radially shapes said lower edge of said main canopy into said generally circular initial opening, providing an air flow path into said mouth for inflating said main canopy, and reefing said lower edge by slidingly engaging said suspension lines at spaced locations around said auxiliary canopy.

28. The method of claim 27 wherein said auxiliary canopy is generally circular and has a periphery which defines the generally circular initial opening of said lower edge of the main canopy.

29. The method of claim 28 wherein said auxiliary canopy has a central inner section and an annular outer sect ion which causes air flow around said inner section to flow into the mouth of said main canopy to more slowly fill said main canopy.

30. The method of claim 28 wherein said auxiliary canopy has a central inner section and an annular outer section which defines a fixed annular inlet area for air flow into the mouth of said main canopy during the filling thereof.

31. The method of claim 29 wherein said inner section is made of a less air permeable material and said outer section is made of a more air permeable material.

32. The method of claim 31 wherein said inner section has an air permeability of 0 to about 200 cubic feet per minute per square foot and said outer section is made of a material which offers little or no resistance to air flow.

33. The method of claim 29 wherein said main canopy is round, said inner portion of said auxiliary canopy is generally hemispherical, and said annular outer portion is generally planar.

\* \* \* \* \*

UNITED STATES PATENT AND TRADEMARK OFFICE
CERTIFICATE OF CORRECTION

PATENT NO.   : 5,890,678
DATED         : April 6, 1999
INVENTOR(S)  : Manley C. Butler, Jr.

It is certified that error appears in the above-identified patent and that said Letters Patent is hereby corrected as shown below:

Drawings,
Sheet 2 of 3, substitute corrected Figure 3 below for original Figure 3.

Column 10,
Lines 5, 7, 55 and 58, cancel "portion" and insert -- section --;
Line 6, cancel "annu";
Line 7, cancel "lar";

Column 11,
Line 29, cancel "annular";

Column 12,
Line 18, cancel "sec tion" and insert -- section --;
Lines 34 and 35, cancel "portion" and insert -- section --.

Signed and Sealed this

Ninth Day of September, 2003

JAMES E. ROGAN
*Director of the United States Patent and Trademark Office*